United States Patent
Alameh et al.

(10) Patent No.: US 10,119,864 B2
(45) Date of Patent: Nov. 6, 2018

(54) DISPLAY VIEWING DETECTION

(71) Applicant: Google Technology Holdings LLC, Mountain View, CA (US)

(72) Inventors: Rachid M. Alameh, Crystal Lake, IL (US); William S. Hede, Lake In The Hills, IL (US); Hisashi D. Watanabe, Lake Forest, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/444,206

(22) Filed: Jul. 28, 2014

(65) Prior Publication Data

US 2015/0260580 A1    Sep. 17, 2015

Related U.S. Application Data

(60) Provisional application No. 61/951,291, filed on Mar. 11, 2014.

(51) Int. Cl.
*G01J 5/02* (2006.01)
*G01J 5/10* (2006.01)
(Continued)

(52) U.S. Cl.
CPC ............... *G01J 5/027* (2013.01); *G01J 5/10* (2013.01); *G06F 1/1605* (2013.01);
(Continued)

(58) Field of Classification Search
CPC .. G06F 3/03; G06F 1/1605; G01J 3/02; G01J 5/027; G01J 5/10
See application file for complete search history.

(56) References Cited

U.S. PATENT DOCUMENTS 6,542,436 B1    4/2003    Myllyla
7,180,502 B2    2/2007    Marvit et al.
(Continued)

FOREIGN PATENT DOCUMENTS

EP    2642729 A1    9/2013
WO    2011040932 A1    4/2011
(Continued)

OTHER PUBLICATIONS

International Search Report and Written Opinion issued in PCT/US2015/016258, mailed May 4, 2015, 14 pages.
(Continued)

*Primary Examiner* — Hugh H Maupin
(74) *Attorney, Agent, or Firm* — Faegre Baker Daniels LLP

(57) ABSTRACT

In embodiments of display viewing detection, a presence module, implemented on an electronic device, enables a first sensor to detect an object responsive to detecting audio via one or more microphones of the electronic device. The first sensor generates data that is used by the presence module to determine that the object is within a viewing range of the electronic device and that movement of the object is below a predetermined threshold. The presence module then enables at least a second sensor to confirm the object is viewing a display of the electronic device. When the object is detected by the second sensor, the presence module enables the display for viewing by the object.

20 Claims, 9 Drawing Sheets

(51) Int. Cl.
*H04R 1/08* (2006.01)
*G06F 1/16* (2006.01)
*G06F 1/32* (2006.01)
*H04W 52/02* (2009.01)
*H04M 1/725* (2006.01)
*G01J 5/00* (2006.01)
*H04M 1/67* (2006.01)

(52) U.S. Cl.
CPC .......... *G06F 1/1694* (2013.01); *G06F 1/3231* (2013.01); *G06F 1/3265* (2013.01); *H04M 1/72569* (2013.01); *H04R 1/08* (2013.01); *H04W 52/0254* (2013.01); *G01J 2005/0077* (2013.01); *G01J 2005/106* (2013.01); *G06F 2200/1637* (2013.01); *H04M 1/67* (2013.01); *H04M 2250/12* (2013.01); *H04M 2250/52* (2013.01); *Y02D 10/153* (2018.01); *Y02D 10/173* (2018.01); *Y02D 70/00* (2018.01); *Y02D 70/142* (2018.01); *Y02D 70/144* (2018.01); *Y02D 70/146* (2018.01); *Y02D 70/26* (2018.01)

(56) References Cited

U.S. PATENT DOCUMENTS

| | | |
|---|---|---|
| 8,180,583 B1 | 5/2012 | Gossweiler et al. |
| 8,344,998 B2 | 1/2013 | Fitzgerald et al. |
| 8,541,745 B2 | 9/2013 | Dickinson et al. |
| 8,560,004 B1 | 10/2013 | Tsvetkov et al. |
| 8,784,271 B2 | 7/2014 | Brumback et al. |
| 2002/0135474 A1 | 9/2002 | Sylliassen |
| 2004/0179431 A1 | 9/2004 | Nakajima |
| 2004/0198464 A1 | 10/2004 | Panian |
| 2008/0140868 A1 | 6/2008 | Kalayjian et al. |
| 2010/0079508 A1 | 4/2010 | Hodge et al. |
| 2011/0250928 A1* | 10/2011 | Schlub et al. ............. 455/550.1 |
| 2012/0082013 A1 | 4/2012 | Yeung et al. |
| 2012/0287031 A1 | 11/2012 | Valko et al. |
| 2013/0147712 A1 | 6/2013 | Zhou et al. |
| 2013/0154906 A1 | 6/2013 | Braun et al. |
| 2013/0234924 A1 | 9/2013 | Janefalkar et al. |
| 2013/0249785 A1 | 9/2013 | Alameh |
| 2013/0344862 A1 | 12/2013 | Alameh et al. |
| 2014/0028551 A1 | 1/2014 | Ruff et al. |
| 2014/0045547 A1* | 2/2014 | Singamsetty et al. ..... 455/552.1 |
| 2014/0143785 A1 | 5/2014 | Mistry et al. |
| 2014/0267034 A1 | 9/2014 | Krulce |
| 2014/0302894 A1 | 10/2014 | Woo |
| 2016/0231871 A1* | 8/2016 | Davis ...................... G06F 3/016 |
| 2016/0247261 A1* | 8/2016 | Rhodes et al. |

FOREIGN PATENT DOCUMENTS

| | | |
|---|---|---|
| WO | 2012/166109 A1 | 12/2012 |
| WO | 2013133923 A1 | 9/2013 |
| WO | 2013162564 A1 | 10/2013 |

OTHER PUBLICATIONS

European Patent Office, International Search Report and Written Opinion for PCT Application No. PCT/US2015/018810, dated May 21, 2015.

U.S. Patent and Trademark Office; Final Rejection; U.S. Appl. No. 14/444,273; dated Feb. 9, 2017.

U.S. Patent and Trademark Office; Non-Final Rejection; U.S. Appl. No. 14/444,273; dated Sep. 20, 2016.

U.S. Patent and Trademark Office; Non-Final Rejection; U.S. Appl. No. 14/444,273; dated Jan. 20, 2016.

European Patent Office; European Search Report; European Application No. 15706651.5; dated Oct. 16, 2017.

* cited by examiner

DISPLAY VIEWING DETECTION

CROSS REFERENCE TO RELATED APPLICATIONS

This application is related to co-owned U.S. patent application No. 14/444,273, entitled "DISPLAY VIEWING DETECTION" and filed concurrently herewith.

BACKGROUND

Many computing devices include displays that are utilized to present information to a user when a notification or alert is received. For example, the display of a smartphone or smart watch may light up and present a text message to the user when the text message is received. However, presenting information on a display uses battery power, and thus it may be a waste of resources to present information on the display when the user is not viewing the display. Further, some devices may enable a user to power on a display by pressing a button. However, this may be inconvenient for users who would prefer to quickly glance at the display to view information without performing any additional action.

BRIEF DESCRIPTION OF THE DRAWINGS

Embodiments of display viewing detection are described with reference to the following Figures. The same numbers may be used throughout to reference like features and components that are shown in the Figures.

DETAILED DESCRIPTION

In embodiments of display viewing detection, a viewing movement module, implemented on an electronic device, determines a viewing movement of the electronic device and a pause in the viewing movement of the electronic device. The viewing movement corresponds to a movement to view a display of the electronic device. Responsive to determining the viewing movement followed by the pause, the viewing movement module enables at least one sensor to confirm that a user is viewing a display of the electronic device. When an object is detected by the sensor, the viewing movement module enables the display for viewing by the user.

In other embodiments of display viewing detection, a presence module, implemented on an electronic device, enables a first sensor to detect an object responsive to detecting audio via one or more microphones of the electronic device. The first sensor generates data that is used by the presence module to determine that the object is within a viewing range of the electronic device and that movement of the object is below a predetermined threshold. The presence module then enables at least a second sensor to confirm the object is viewing a display of the electronic device. When the object is detected by the second sensor, the presence module enables the display for viewing by the object.

While features and concepts of display viewing detection can be implemented in any number of different devices, systems, and/or configurations, embodiments of display viewing detection are described in the context of the following example devices, systems, and methods.

Figure 1:
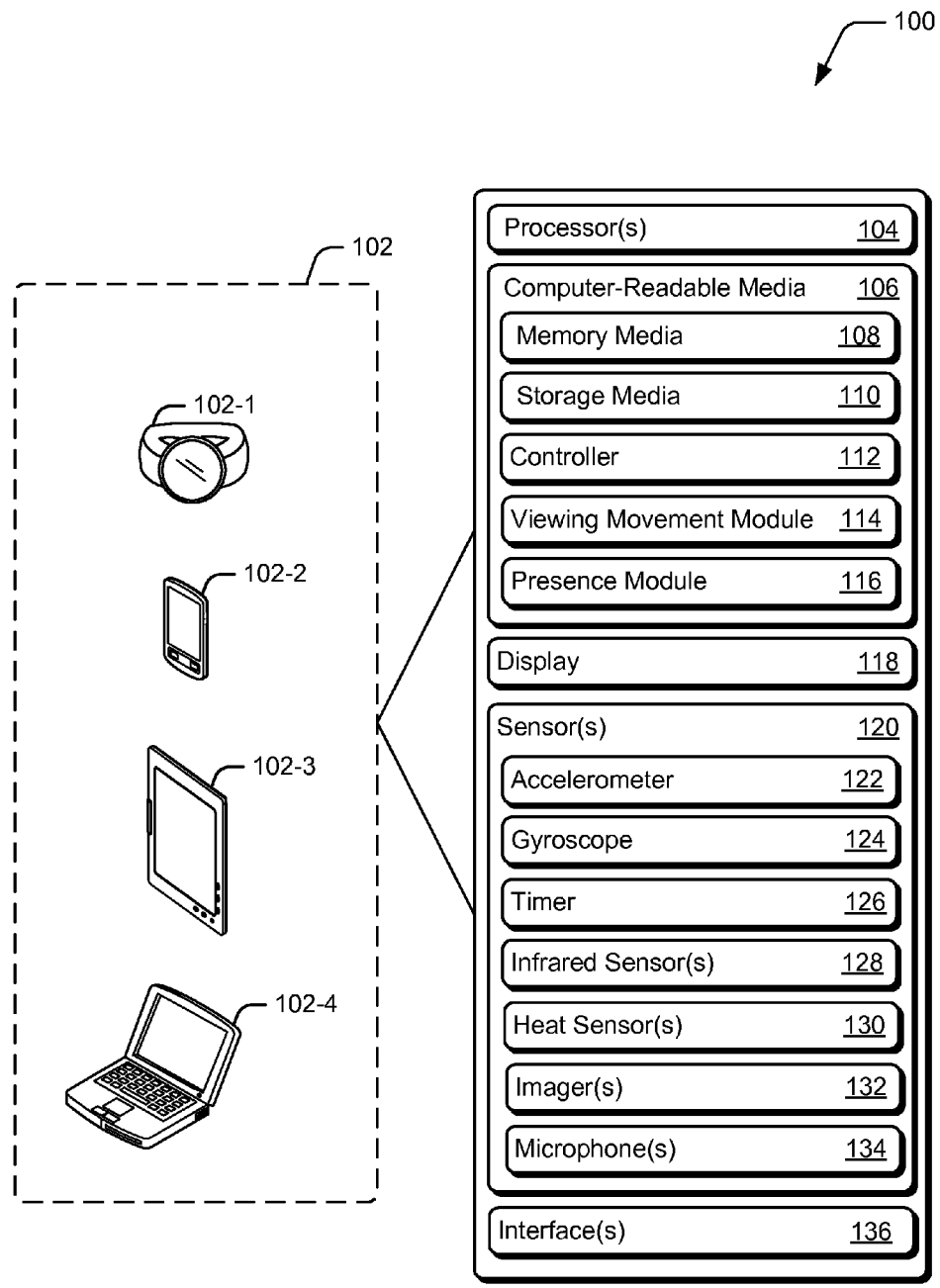
FIG. 1 illustrates an example system in which embodiments of display viewing detection can be implemented.

FIG. 1 is an illustration of an example environment 100 in which display viewing detection can be implemented. Environment 100 includes an electronic device 102 ("device 102"), which is illustrated with various non-limiting example devices: a wearable device 102-1, a wireless communication device 102-2, a tablet computing device 102-3, and a laptop 102-4. Wearable device 102-1 may be implemented as any type of wearable device, such as a smart watch, a smart bracelet, a smart ring, or any other type of wrist-worn, hand-worn, or finger-worn device. It is to be appreciated that electronic device 102 may also be implemented as a television device, a desktop computer device, an entertainment device, a gaming device, a navigation device, and/or other type of electronic device.

Device 102 includes processor(s) 104 and computer-readable media 106, which includes memory media 108 and storage media 110. Applications and/or an operating system (not shown) embodied as computer-readable instructions on computer-readable media 106 can be executed by processor(s) 104 to provide some or all of the functionalities described herein. Computer-readable media 106 also includes a controller 112, a viewing movement module 114, and a presence module 116, which will be described in more detail below.

Electronic device 102 further includes a display 118 that can be controlled to render or display information and images for viewing. For example, display 118 can render information and images, such as text messages, calendar alerts, and the like, on a display face of wearable device 102-1. As will be discussed in more detail below, display 118 can be automatically enabled when it is determined that a user of device 102 is viewing display 118. As described herein, enabling the display corresponds to powering on the display, lighting up the display, rendering information on the display, and so on. In some cases, enabling display 118 corresponds to enabling one or more portions of display 118. For example, a portion of display 118 may be configured to render a current time. In some cases, therefore, when it is determined that the user is viewing display 118, only the portion corresponding to the current time may be enabled. Similarly, when a portion of display 118 is configured to render information associated with new text messages, this portion of display 118 may be enabled when the user is viewing display 118 and a new text message has been received.

In order to determine whether the user is viewing display 118, electronic device 102 includes one or more sensors 120 that are configured to receive sensor data, such as sensor data corresponding to movement of device 102 by a user and/or movement of the user towards device 102. Sensors 120 are illustrated as including an accelerometer 122, a gyroscope 124, a timer 126, infrared sensor(s) 128, heat sensor(s) 130, an imager 132, and microphone(s) 134. It is to be appreciated, however, that device 102 may include some or all of these sensors, and may also include one or more additional sensors which are not illustrated in environment 100.

Accelerometer 122 is configured to detect acceleration of electronic device 102, and to generate acceleration data. In some implementations, accelerometer 122 may be implemented as a 3-axis accelerometer and is configured to detect acceleration of electronic device 102 in the z, y, and z directions.

Gyroscope 124 is configured to detect rotation of electronic device 102, and to generate rotation data. In some implementations, gyroscope 124 may be implemented as a 3-axis gyroscope that is configured to detect rotation of electronic device 102 in three dimensions using the x-axis, y-axis, and z-axis.

Timer 126 is configured to measure a time interval or a delay corresponding to any predetermined or user configurable amount of time Infrared sensor(s) 128 are configured to detect an object by detecting reflections of an infrared beam off of the object. Infrared sensor 128 may include a transmitter that transmits an infrared beam, and a receiver that receives reflections of the infrared beam off of the object.

Heat sensor(s) 130 are configured to detect an object by sensing heat from the object. Heat sensor 130 may be implemented as a passive heat sensor that includes a receiver that is configured to detect heat from objects. Heat sensor 130 may be implemented as a narrow-beam heat sensor 130 that can detect heat within one to two feet of device 102. For example, the heat sensor may be implemented as a thermopile type infrared sensor or a pyro electric motion sensor that includes a receiver configured to detect heat at approximately 10 micrometers. Heat sensor 130 may also be implemented as a wide-beam heat sensor 130 that can detect objects at greater distances from device 102. For example, wide-beam heat sensor 130 may be implemented as a passive wide-beam heat sensor that includes a receiver configured to detect heat from an object that is located up to 20 feet from device 102

Imager 132 is configured to detect an object by capturing an image of the object. Thus, imager 132 can be used to confirm that a user is the owner of device 102 or associated with device 102. Microphone(s) 134 are configured to detect audio or noise, which may be generated by a user.

Electronic device 102 may also include interface(s) 136 that enable wired and/or wireless communication of data. Interfaces 136 can include wireless personal-area-network (WPAN) radios compliant with various WPAN standards, such as IEEE 802.15 (which includes Bluetooth™) standards, infrared data association (IrDA) standards, or wireless USB standards, to name just a few. Interfaces 136 can also include, by way of example and not limitation, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

Electronic device 102 can also be implemented with any number and combination of differing components as further described with reference to the example device shown in FIG. 9.

Initiating Active Device Mode or Stationary Device Mode

In one or more implementations, controller 112 is configured to initiate an active device mode when device 102 is with a user (e.g., the user is holding or wearing device 102), and a stationary device mode when the device is not with the user.

Figure 2:
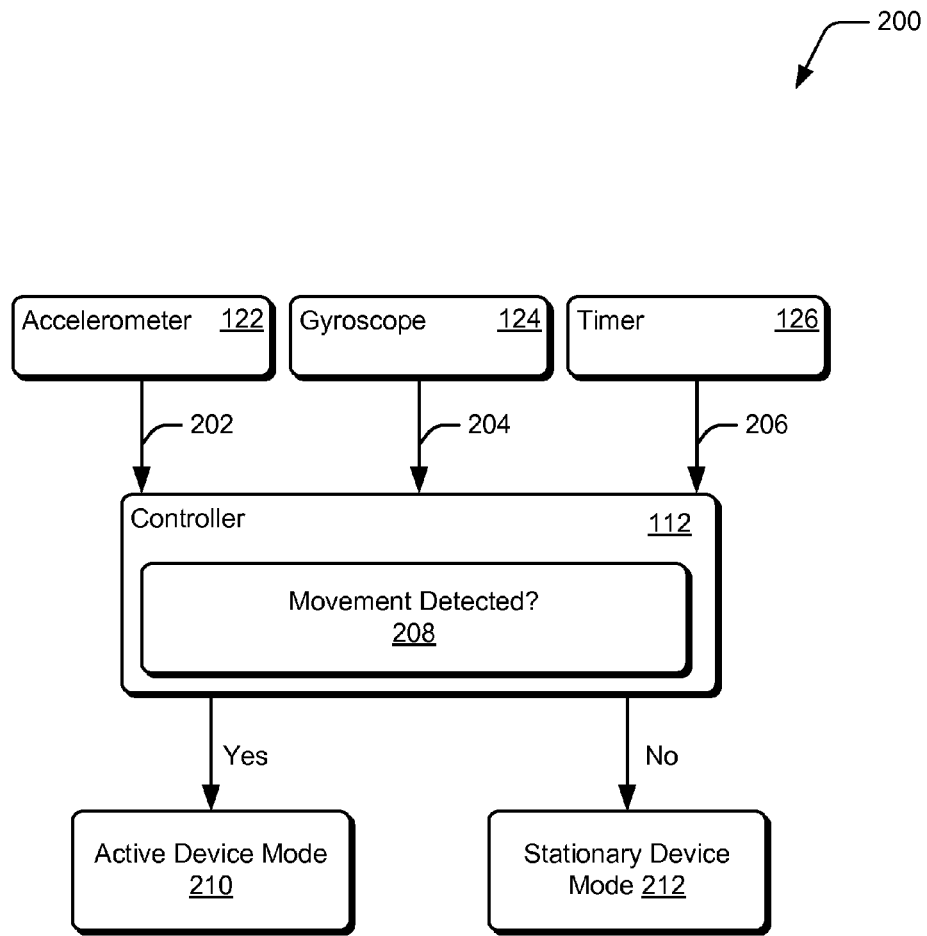
FIG. 2 illustrates an example system in which a controller initiates an active device mode or a stationary device mode.

Consider, for example, FIG. 2 which illustrates a system 200 in an example implementation in which controller 112 initiates an active device mode or a stationary device mode. Controller 112 (FIG. 1) is configured to receive acceleration data 202, rotation data 204, and timer data 206 from accelerometer 122, gyroscope 124, and timer 126, respectively.

Based on data 202, 204, and 206, controller 112 determines whether movement has been detected within a given time period at 208.

For example, accelerometer 122 may detect acceleration of device 102, and provide acceleration data 202 to controller 112 that indicates movement of electronic device 102. Alternately or additionally, gyroscope 124 may detect rotation of device 102, and provide rotation data 204 to controller 112 that indicates rotational movement of device 102. Timer 126 is configured to generate a time period, which may correspond to any period of time, such as 60 seconds, five minutes, or ten minutes.

When controller 112 detects movement of electronic device 102 within the time period set by timer 126, controller 112 determines that device 102 is with the user of the device and initiates an active device mode at 210. Controller 112 determines that the device is with the user because when the device is on the user's wrist, in the user's hand, or in the user's pocket, the sensors will detect movement of the device. The active device mode is discussed in more detail below in the section entitled "Active Device Mode"

Alternately, when movement of electronic device 102 is not detected within the time period set by timer 126, controller 112 determines that device 102 is not with the user, and initiates a stationary device mode at 212. Controller 112 determines that device 102 is not with the user when movement is not detected because when the device is not with the user (e.g., on a table or other surface), the sensors will not detect movement of the device. The stationary device mode is discussed in more detail below in the section entitled "Stationary Device Mode".

In one or more implementations, device 102 further includes a wearability sensor, such as a wrist detect sensor for wrist-worn devices or a side sensor for hand-held devices. The wearability sensor can be utilized by controller 112 to determine whether the device is with the user (e.g., on the user's wrist or the user's hand) or is laying stationary on a surface. In these implementations, therefore, controller 112 may initiate the active device mode or the stationary device mode based on data received from the wearability sensor.

Active Device Mode

In the active device mode, device 102 is with the user, such as on the user's wrist, in the user's hand, or in the user's pocket or purse. Many times throughout the day, a user may glance at display 118 of device 102 to view information, such as a calendar invite, a text message, a missed call, or a score of a sports game. Each time the user views display 118, the display must be enabled or powered on in order for the user to view information on the display.

In conventional solutions, there are two common ways to enable a display. The first way, requires the user to press a power button on the device whenever the user wishes to view the display. This approach may be inconvenient for the user, especially when device 102 is implemented as a smart watch and the user may wish to quickly view information on display 118. The second way is to leave the display enabled at all times or to enable the display when notifications are received. Enabling the display at all times is a waste of resources because there is no reason for the display to be enabled when the user is not viewing the display. Enabling the display when a notification is received may also waste resources because the user may not be viewing the display when the notification is received.

In the active device mode, electronic device 102 is configured to determine when the user moves the device to view the display, and to enable the display responsive to determining that the user is viewing the display. In this way, the battery power of device 102 is not wasted, because the display is only powered on when the user is viewing the display. Further, this approach is much more convenient for the user because the user may simply move the device to look at display 118, without pressing any buttons, in order to view information on display 118.

Figure 3:
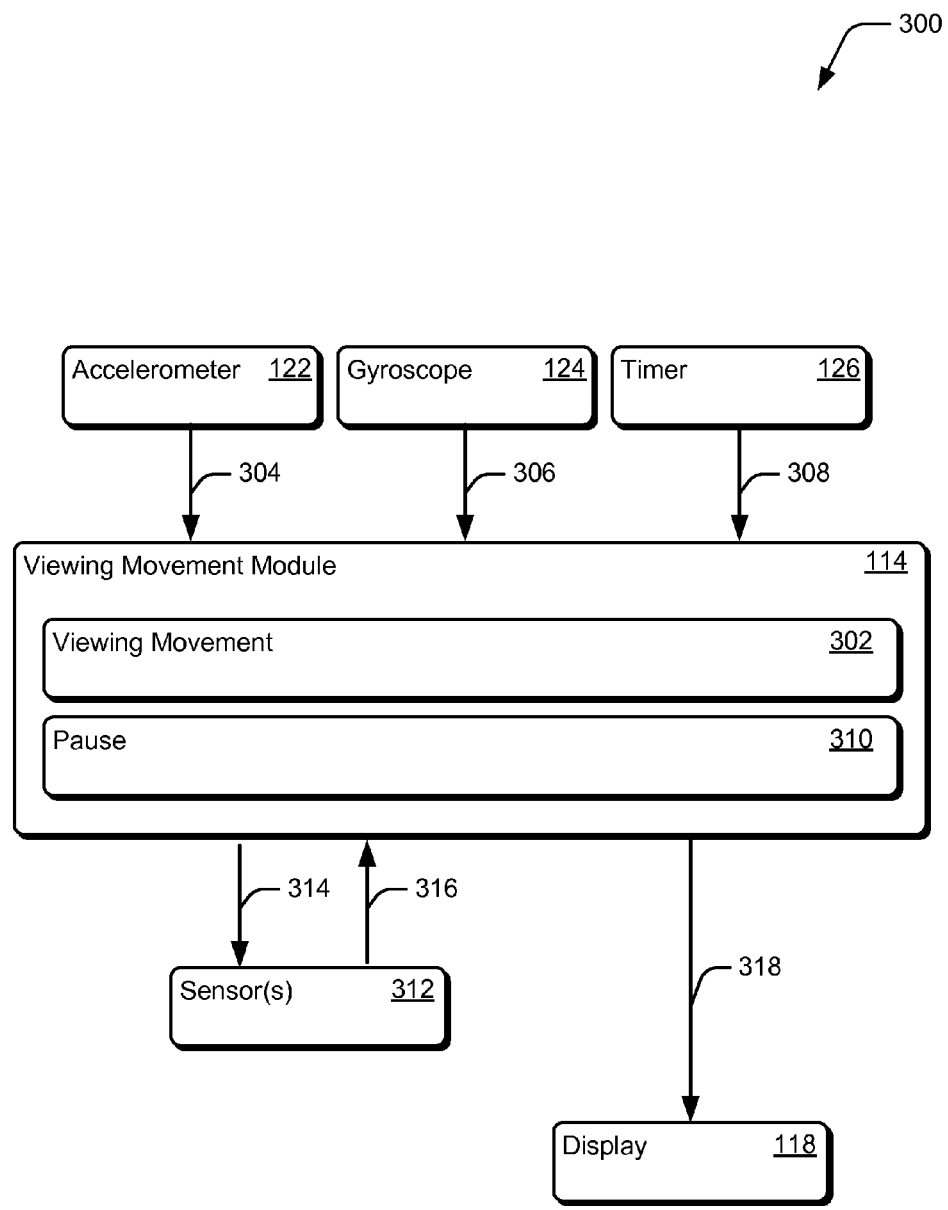
FIG. 3 illustrates an example system in which a viewing movement module enables a display of an electronic device in an active device mode.

FIG. 3 illustrates an example system 300 in which viewing movement module 114 enables display 118 of electronic device 102 in an active device mode. In the active device mode, electronic device 102 enables the user to view display 118 by simply moving the device to view the display, without having to press any additional buttons or controls.

Consider now a more detailed discussion of how viewing movement module 114 enables display 118 in the active device mode by (1) determining a viewing movement, (2) detecting a pause, (3) enabling a sensor to confirm the user is viewing the display, and (4) enabling the display.
Determining a Viewing Movement In the active device mode, viewing movement module 114 is configured to determine a viewing movement 302 of electronic device 102. As described herein, a "viewing movement" may correspond to any movement of electronic device 102 by a user to view display 118. In one or more implementations, viewing movement 302 may include a linear movement and/or a twisting movement. For example, when device 102 is implemented as wearable device 102-1 (e.g., a smart watch or a smart bracelet that is worn on the user's wrist), the user may view device 102 by performing a linear movement to pull the user's wrist towards the user's eyes, and performing a twisting movement to rotate the user's wrist towards the user's body. Similarly, when device 102 is implemented as wireless communication device 102-2 and held in the user's hand, the user may view device 102 by performing the linear movement to pull device 102 towards the user's eyes. In this case, the user may or may not also perform the twisting movement to rotate device 102 towards the user's body.

Viewing movement module 114 can determine the viewing movement in a variety of different ways using sensor data from one or more sensors 120. In example 300, viewing movement module 114 is configured to monitor an output from accelerometer 122, gyroscope 124, and timer 126. Viewing movement module 114 determines viewing movement 302 based on acceleration data 304 received from accelerometer 122 and/or rotation data 306 received from gyroscope 124.

Accelerometer 122 is configured to detect acceleration of device 102. Thus, accelerometer 122 can detect a linear movement whenever device 102 moves in a straight, or partially straight, line. The linear movement may correspond to the user pulling device 102 towards the user's eyes to view display 118. When the user is standing, the user may pull the device up to bring device 102 closer to the user's eyes. Alternately, when the user is lying down, the user may pull device 102 down to bring the device closer to the user's eyes. Accelerometer 122 monitors the acceleration of device 102, and outputs acceleration data 304. Viewing movement module 114 receives acceleration data 304, and determines the linear movement based on acceleration data 304.

Gyroscope 124 is configured to monitor the rotation of device 102. Thus, gyroscope 124 can detect a twisting movement whenever device 102 is rotated towards the user's body. The twisting movement may correspond to the user twisting device 102 towards the user's body to view display 118. Gyroscope 124 monitors the rotation of device 102, and outputs rotation data 306. Viewing movement module 114 receives rotation data 306, and determines the twisting movement based on rotation data 306.

To view display 118, many users will twist device 102 in a single direction towards their body. Thus, in one or more embodiments, viewing movement module 114 is configured to filter out twisting movements in the opposite direction (e.g., away from the user's body). When device 102 is a wrist-worn device, viewing movement module 114 can determine which hand device 102 is worn on as soon as the user starts moving device 102 based on acceleration data 304 received from accelerometer 122 and rotation data 306 received from gyroscope 124. Similarly, when device 102 is a handheld device, viewing movement module 114 can determine which hand device 102 is held in as soon as the user starts moving device 102 based on acceleration data 304 received from accelerometer 122 and rotation data 306 received from gyroscope 124. This initial determination enables viewing movement module 114 to determine whether rotation data 306 received from gyroscope 124 corresponds to the twisting movement to view display 118, or to a random movement.

In one or more implementations, viewing movement module 114 determines that viewing movement 302 occurred when the linear movement and the twisting movement are detected within a predetermined time interval. To do so, viewing movement module 114 receives timing data 308 from timer 126, and determines whether both the linear movement and the twisting movement occurred within a predetermined time interval set by timer 126. The predetermined time interval may be set by timer 126 or it may be configurable by the user. In general, the predetermined time interval corresponds to a brief amount of time, such as one second or less. The brief time interval ensures that the linear movement and the twisting movement are received sequentially or at least partially simultaneously. For example, when the user performs a linear movement without the twisting movement, or vice versa, and then much later performs the other of the linear movement and the twisting movement, these movements are likely random.

In one or more embodiments, the order in which the linear movement and the twisting movement are detected does not affect the determination of viewing movement 302 as long as both movements are detected within the time interval. For instance, the twisting movement may be detected before or after the linear movement is detected. Further, in one or more embodiments the viewing movement may be determined when just one of the linear movement and the twisting movement are detected. For example, to view a handheld device, the user may simply move the device in a linear movement, without twisting the device, to view display 118.

Detecting a Pause

Viewing movement module 114 is further configured to detect a pause 310 in the movement of device 102 after the viewing movement 302. The pause may correspond to a brief period of time, such as one second or less, that occurs after the viewing movement. Consider, for example, that after pulling and twisting device 102 towards the user's eyes, that the user may pause this movement for a second or a split-second so that the user is able to view display 118. Viewing movement module 114 can detect pause 310 based on acceleration data 304 received from accelerometer 122, rotation data 306 received from gyroscope 124, and timing data 308 received from timer 126. Acceleration data 304 enables viewing movement module 114 to determine that device 102 has stopped moving, or that movement of device 102 is below a threshold. Rotation data 306 enables viewing movement module 114 to determine that device 102 is no longer twisting or rotating, and timing data 308 enables viewing movement module 114 to determine that device 102 has stopped moving for a time interval.

After determining viewing movement 302 followed by pause 310, viewing movement module 114 is able to determine that the user is likely viewing display 118. Thus, in one or more implementations, viewing movement module 114 may enable display 118 for viewing after determining viewing movement 302 followed by pause 310. It is possible, however, that the viewing movement followed by the pause may correspond to a movement other than a viewing movement. For example, when the user is wearing device 102 on the user's wrist, and the user raises his hand or waves to a friend, it is possible that these movements may also be interpreted by viewing moment module 114 as a viewing movement. Thus, in other implementations viewing movement module 114 may perform one or more other operations to confirm that the user is viewing display 118 prior to enabling display 118.

Enabling Sensor(s) to Confirm User is Viewing Display

In one or more implementations, when viewing movement module 114 determines viewing movement 302 followed by pause 310, viewing movement module 114 is configured to enable one or more sensors 312 to confirm that the user is viewing display 118. As described herein, enabling a sensor refers to powering on a sensor that was previously disabled. It is to be appreciated that enabling sensors 312 after the viewing movement and the pause is determined results in a significant power savings for device 102 because the sensors 312 are not used until they are needed to confirm the user is viewing display 118. To enable sensors 312, viewing movement module 114 sends one or more control signals 314 to the sensors 312.

The one or more sensors 312 enabled by viewing movement module 114 may include infrared sensor 128, heat sensor 130, and/or imager 132. It is to be appreciated, however, that viewing movement module 114 may enable any type of sensor 312 to confirm that the user is viewing display 118.

Sensors 312 may include an infrared sensor 128. Infrared sensor 128 may be implemented as a narrow-beam infrared sensor that can detect objects within one to two feet of device 102. Once enabled, infrared sensor 128 transmits an infrared beam and monitors for a reflection of the beam off of a nearby object. For example, infrared sensor 128 may include a transmitter that transmits a short infrared beam with a wavelength of approximately 850 nanometers to 950 nanometers, and a receiver that receives reflections of the infrared beam off of objects at approximately 860 nanometers. Infrared sensor 128 is positioned proximate display 118 on the front of device 102 and thus will not detect an object (e.g., the user's face) unless the device is twisted towards the user's face. When the user is viewing display 118, infrared sensor 128 will detect the user's face because the narrow-beam reflects off of the user's face back towards infrared sensor 128. When an object is detected by infrared sensor 128, the infrared sensor sends a control signal 316 to viewing movement module 114 informing viewing movement module 114 than an object is detected.

Alternately or additionally, sensors 312 may include one or more heat sensors 130. Heat sensor 130 may be implemented as a passive narrow-beam heat sensor 130 that can detect heat within one to two feet of device 102. For example, the heat sensor may be implemented as a thermopile type infrared sensor or a Pyro electric motion sensor that includes a receiver configured to detect heat at approximately 10 micrometers. Note, therefore, that unlike infrared sensor 128, heat sensor 130 does not include a transmitter. Once enabled, heat sensor 130 is able to detect the presence of heat. Heat sensor 130 is positioned proximate display 118 on the front of device 102 and thus will not detect an object (e.g., the user's face) unless display 118 is twisted towards the user's face. When the user is viewing display 118, heat sensor 130 detects the user's face by detecting heat from the user's face. When an object is detected by heat sensor 130, the heat sensor sends a control signal 316 to viewing movement module 114 informing viewing movement module 114 that an object is detected.

Alternately or additionally, sensors 312 may include imager 132. Imager 132 may detect the user by capturing an image of the user's face. Enabling imager 132 may increase the accuracy of the determination that the user is viewing display 118. However, imager 132 uses more power than either infrared sensor 128 or heat sensor 130. In some cases, therefore, it may not make sense to enable imager 132 to confirm the user is viewing display 118 due to the power expenditure.

In one or more embodiments, viewing movement module 114 simultaneously enables two or more sensors 312. For example, viewing movement module 114 may simultaneously enable two or more of the infrared sensor 128, heat sensor 130, and imager 132 to confirm that the user is viewing display 118. While enabling two or more sensors may result in greater power expenditure, it increases the accuracy of the determination that the user is viewing display 118. For example, infrared sensor 128 can detect the presence of an object, but not the user specifically. Similarly, heat sensor 130 can detect heat, but the detected heat may not necessarily be from the face of the user. However, when both of these sensors detect an object, viewing movement module 114 can determine with a very high degree of accuracy that the user is viewing display 118.

In one or more implementations, to confirm that the user is viewing display 118, viewing movement module 114 sequentially enables two or more sensors. For example, viewing movement module 114 may enable a first sensor to detect an object. The first sensor enabled may be one of infrared sensor 128, heat sensor 130, or imager 132. When the first sensor detects the object, viewing movement module 114 may then enable a second sensor to detect the object. The second sensor may be a different one of infrared sensor 128, heat sensor 130, or imager 132. When the second sensor also detects the object, viewing movement module 114 determines that the user is viewing display 118. However, when the first sensor does not detect the object, viewing movement module 114 does not enable the second sensor. It is to be appreciated, therefore, that sequentially enabling two or more sensors uses less power than simultaneously enabling two or more sensors because when the first sensor does not detect the object the second sensor does not need to be enabled.

In one or more implementations, viewing movement module 114 simultaneously or sequentially enables both infrared sensor 128 and heat sensor 130. When each of these sensors detects the object, viewing movement module 114 enables imager 132 to confirm that the user is viewing display 118.

In one or more implementations, imager 132 may be used to confirm that the user viewing display 118 is the owner of device 102 or associated with device 102. For example, imager 132 is able to recognize specific users, and thus can be used to confirm that the user that is viewing display 118 is the actual owner of device 102. In some cases, certain types of information may be presented to the user only when imager 132 confirms that the user is the owner of device 102. For example, a text message may not be presented to the user unless imager 132 confirms the user is the owner of device 102.

Enabling the Display

When viewing movement module 114 confirms that the user is viewing display 118, viewing movement module 114 transmits a control signal 318 to display 118 to enable display 118 for viewing. As described herein, enabling the display corresponds to one or more of powering on the display, lighting up the display, or rendering information on the display. For example, in some cases the display may be powered off or dark until viewing movement module 114 detects the user is viewing the display. Viewing movement module 114 then enables display 118 by powering on or lighting up the display so that the viewer can see the display.

Alternately or additionally, viewing movement module 114 may enable the display by rendering information on the display, such as incoming alerts, missed messages, recently received text messages, calendar notifications, caller ID, and so on. Currently, many devices render information on the display whenever a notification or an alert is received. Therefore, rendering the information only after detecting the user is viewing the display results in power savings by not unnecessarily lighting up the display or rendering information on the display when the user is not looking at the display.

In some cases, enabling the display corresponds to enabling one or more portions of display 118. For example, a portion of display 118 may be configured to render a current time. In some cases, therefore, when it is determined that the user is viewing display 118, only the portion corresponding to the current time may be enabled. Similarly, when a portion of display 118 is configured to render information associated with new text messages, this portion may only be rendered when a new text message has been received.

Consider now a discussion of enabling the display in the stationary device mode.

Stationary Device Mode

Device 102 may not always be with the user. For example, the user may place device 102 in a stationary position, on a surface such as a table or a desk. When device 102 is in a stationary position, the device may continue to receive notifications, such as missed messages, recently received text messages, calendar notifications, caller ID, and so on. Some conventional devices may enable the display to render these notifications each time the notification is received. For example, when the user receives a text message, the display may be powered on to present the text message to the user. However, enabling the display when the device is not with the user may be a waste of resources.

In some cases, when the device is in a stationary position, the user may wish to walk towards the device and glance at the device to check the time or to see whether any notifications have been received. Many conventional devices require the user to pick the device up and press a button to power on the display in order to view these notifications. This approach is inconvenient for the user because the user must perform one or two additional actions to simply view information on the display.

In one or more implementations, in the stationary device mode, electronic device 102 is configured to determine when the user moves within a viewing range of the device to view the display, and to enable the display responsive to determining that the user is viewing the display. In this way, the battery power of device 102 is not wasted, because the display is only powered on when the user is viewing the display. Further, this approach is much more convenient for the user because the user may simply move towards device 102 and look at display 118, without lifting the device or pressing any buttons, in order to view information on display 118.

Figure 4:
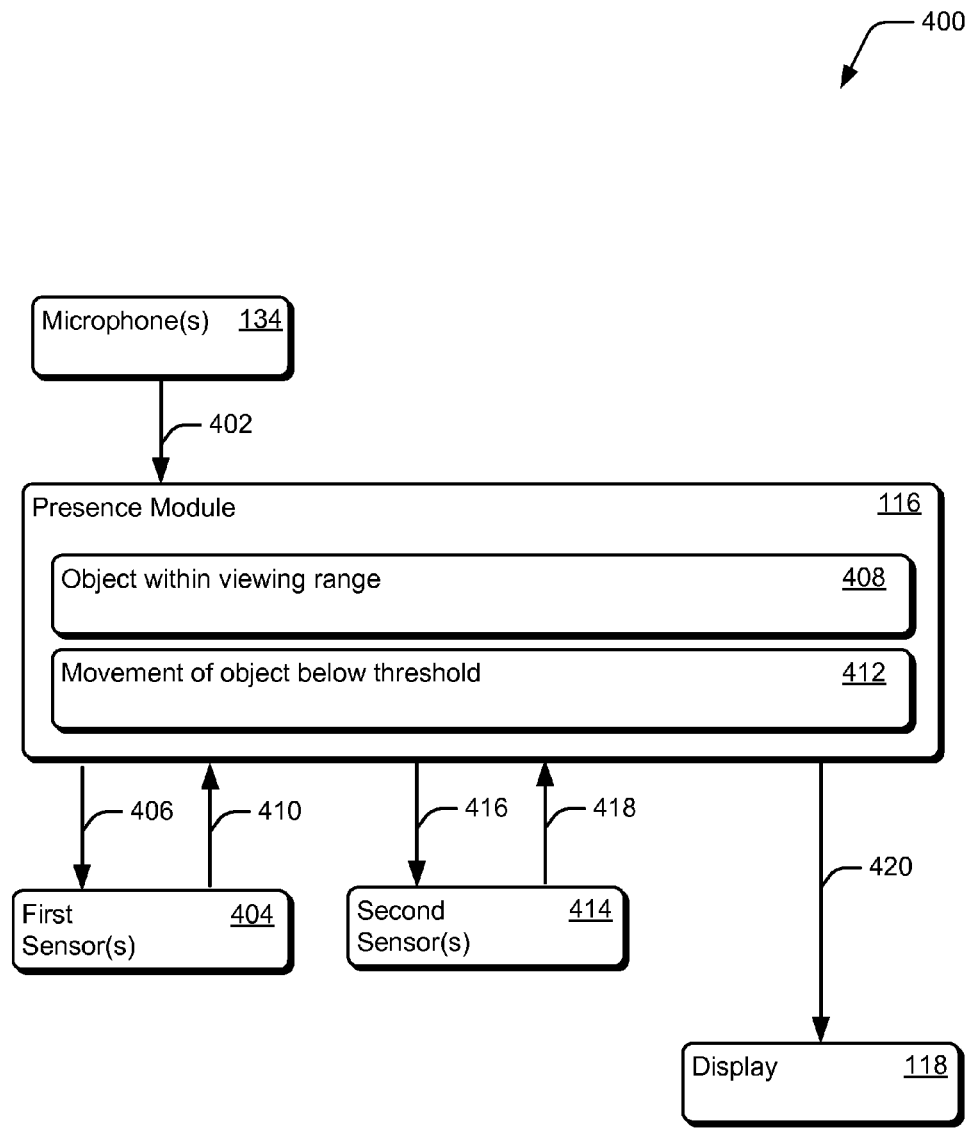
FIG. 4 illustrates an example system in which a presence module enables the display of the electronic device in a stationary device mode.

FIG. 4 illustrates an example system 400 in which presence module 116 enables display 118 of electronic device 102 in a stationary device mode. In the stationary device mode, electronic device 102 enables the user to view display 118 by simply moving within viewing range of the display and viewing the display. The user does not have to pick up the device, or press any additional buttons or controls.

Consider now a more detailed discussion of how presence module 116 enables display 118 in the stationary device mode by (1) detecting audio, (2) enabling a first sensor, (3) determining that an object is within viewing range, (4) determining that movement of the object is below a threshold, (5) enabling a second sensor, and (6) enabling the display.

Detecting Audio

When device 102 is in the stationary device mode, microphone 134 is enabled, and all other sensors on device 102 are disabled. Disabling all sensors other than microphone 134 results in significant power savings for device 102. Microphone 134 is configured to listen for audio or noise that may indicate the presence of a user. For example, when the user opens a door, or walks into a room in which device 102 is located, the user will make noise, which can be detected by microphone 134.

When audio or noise is detected by microphone 134, microphone 134 sends an audio signal 402 to presence module 116. Presence module 116 then determines whether the audio signal corresponds to noise generated by the presence of a user.

Enabling a First Sensor

When presence module 116 determines that the audio signal 402 generated by microphone 134 may correspond to the presence of a user, presence module 116 enables one or more first sensor(s) 404 to detect an object corresponding to the user. To do so, presence module 116 sends a control signal 406 to the one or more first sensors 404. First sensors 404 may be implemented as one or more of infrared sensor 128, heat sensor 130, imager 132, or any other type of sensor configured to detect an object.

In one or more implementations, first sensor 404 is a wide-beam heat sensor 130. Unlike a narrow-beam heat sensor that detects heat from an object that is within close range of device 102, wide-beam heat sensor 130 is configured to detect objects at greater distances from device 102.

For example, wide-beam heat sensor 130 may be implemented as a passive wide-beam heat sensor that includes a receiver configured to detect heat from an object that is located up to 20 feet from device 102 at any position relative to device 102.

In one or more implementations, wide-beam heat sensor 130 may be implemented as a collection of heat sensors 130 pointed in differing directions from device 102 to collectively form a wide beam heat sensor. In this implementation, presence module 116 may enable the multiple heat sensors simultaneously to form a wide overall beam to locate the user, or sequentially in a scanning mode to locate the user. For example, presence module 116 can adjust the coverage of the wide-beam heat sensor 130 based on a distance of the object from device 102 by enabling and disabling different ones of the multiple heat sensors.

Determining Object is Within Viewing Range

Presence module 116 is configured to determine when the object (e.g., the user) is within a viewing range 408 of electronic device 102. As described herein, the viewing range corresponds to a distance from device 102 at which a user can view information on display 118. Typically, this viewing range may correspond to a less than five feet from device 102, but the viewing range may be configured to be any distance based on the size of display 118.

Presence module 116 may determine whether the user is within the viewing range of device 102 based on sensor data 410 received from the enabled first sensor 404. For example, when implemented as heat sensor 130, first sensor 404 can detect an increased amount of body heat from a user as the user approaches device 102, and generate sensor data 410 corresponding to the distance of the user from device 102. In one or more implementations, as the user approaches device 102, presence module 116 may enable or disable different ones or groups of first sensors 404 to "zoom in" on the user. For example, the coverage of wide-beam heat sensors 130 may be continuously adjusted by presence module 116 based on the user's position relative to device 102.

Alternately or additionally, presence module 116 may determine whether the user is within the viewing range of device 102 based on audio signal 402 received from microphone 134. As the user approaches device 102, the noise or audio detected by microphone 134 will increase in volume. For example, the noise caused by the footsteps of the user walking will increase in volume as the user approaches device 102.

Determining Movement of Object is Below a Threshold

When presence module 116 determines that the object is within viewing range of device 102, presence module 116 then determines whether movement of the object (e.g., the user) is below a threshold 412. The threshold may correspond to a low amount of movement, and thus the movement of the object will be below the threshold when the user is standing or sitting mostly still. When the movement is above the threshold, it is likely that user is simply passing by device 102 without looking at display 118. However, when the object is within the viewing range and the movement has dropped below the threshold, presence module determines that the user may be viewing display 118 of device 102. For example, to view device 102 when the device is on a table, the user may walk up to the device, pause, and look down at display 118 to view the display.

Presence module 116 determines that the movement of the user is below the threshold based on sensor data 410 from first sensor 404 and/or audio signal 402 from microphones 134. For example, when the user is no longer moving, heat detected by wide-beam heat sensor 130 will remain mostly constant, and microphone 134 may detect little or no noise from the user.

Enabling a Second Sensor

When presence module 116 determines that the object is within viewing range of display 118, and that movement of the object is below the threshold, presence module 116 enables one or more second sensors 414 to confirm that the object corresponds to a user that is viewing display 118. It is to be appreciated that enabling second sensors 414 after determining that the object is within viewing range of display 118 and that movement of the object is below the threshold results in a large power savings for device 102. To enable second sensors 414, presence module 116 sends one or more control signals 416 to the second sensors 414.

Presence module 116 may enable any type of second sensors 414 to confirm that the object corresponds to a user viewing display 118, including by way of example and not limitation, infrared sensor 128, heat sensor 130, and/or imager 132. In one or more embodiments, the one or more second sensors 414 are narrow-beam sensors, as opposed to the first sensors that are wide-beam sensors.

Second sensors 414 may include one or more infrared sensors 128. Infrared sensor 128 may be implemented as a narrow-beam infrared sensor that can detect objects within one to five feet of device 102. Once enabled, infrared sensor 128 transmits an infrared beam and monitors for a reflection of the beam off of a nearby object. Infrared sensor 128 is positioned proximate display 118 on the front of device 102 and thus will not detect an object (e.g., the user's face) unless the user is within one to five feet of device 102. When the user is viewing display 118, infrared sensor 128 detects the user's face because the narrow-beam reflects off of the user's face back towards infrared sensor 128. When an object is detected by infrared sensor 128, the infrared sensor sends a control signal 418 back to viewing presence module 116 informing presence module 116 than an object is detected.

Alternately or additionally, second sensors 414 may include one or more heat sensors 130. Heat sensor 130 may be implemented as a passive narrow-beam heat sensor 130 that can detect heat within one to five feet of device 102. Note, therefore, that unlike infrared sensor 128, heat sensor 130 does not include a transmitter. Once enabled, heat sensor 130 is able to detect the presence of heat. Heat sensor 130 is positioned proximate display 118 on the front of device 102 and thus will not detect an object (e.g., the user's face) unless the user is within one to five feet of the device. When the user is viewing display 118, heat sensor 130 detects the user's face by detecting heat from the user's face. When an object is detected by heat sensor 130, the heat sensor sends a control signal 418 back to presence module 116 informing presence module 116 that an object is detected.

Alternately or additionally, second sensors 414 may include imager 132. Imager 132 may detect the user by capturing an image of the user's face. Enabling imager 132 may increase the accuracy of the determination that the user is viewing display 118. However, imager 132 uses more power than either infrared sensor 128 or heat sensor 130. In some cases, therefore, it may not make sense to enable imager 132 to confirm the user is viewing display 118 due to the power expenditure.

In one or more embodiments, presence module 116 simultaneously enables two or more second sensors 414. For example, presence module 116 may simultaneously enable two or more of infrared sensor 128, heat sensor 130, and imager 132 to confirm that the object corresponds to a user that is viewing display 118. While enabling two or more sensors may result in greater power expenditure, it increases the accuracy of the determination that the user is viewing display 118. For example, infrared sensor 128 can detect the presence of an object, but not the user specifically. Similarly, heat sensor 130 can detect heat, but the detected heat may not necessarily be from the face of the user. However, when both of these sensors detect an object, presence module 116 can determine with a very high degree of accuracy that the user is viewing display 118.

In one or more implementations, to confirm that the object corresponds to a user that is viewing display 118, presence module 116 sequentially enables two or more second sensors 414. For example, presence module 116 may enable a first sensor to detect an object. The first sensor enabled may be one of infrared sensor 128, heat sensor 130, or imager 132. When the first sensor detects the object, presence module 116 may then enable a second sensor to detect the object. The second sensor may be a different one of infrared sensor 128, heat sensor 130, or imager 132. When the second sensor also detects the object, presence module 116 determines that the user is viewing display 118. However, when the first sensor does not detect the object, presence module 116 does not enable the second sensor. It is to be appreciated, therefore, that sequentially enabling two or more sensors uses less power than simultaneously enabling two or more sensors because when the first sensor does not detect the object the second sensor does not need to be enabled.

In one or more embodiments, presence module 116 simultaneously or sequentially enables both infrared sensor 128 and heat sensor 130. When each of these sensors detects the object, presence module 116 quickly enables imager 132 to confirm that the user is viewing display 118.

In one or more implementations, imager 132 may be used to confirm that the user viewing display 118 is the owner of device 102 or associated with device 102. For example, imager 132 is able to recognize specific users, and thus can be used to confirm that the user that is viewing display 118 is the actual owner of device 102. In some cases, certain types of information may be presented to the user only when imager 132 confirms that the user is the owner of device 102. For example, a text message may not be presented to the user unless imager 132 confirms the user is the owner of device 102.

Enabling the Display

When presence module 116 confirms that the object corresponds to a user that is viewing display 116, presence module 116 transmits a control signal 420 to display 118 to enable display 118 for viewing. As described throughout, enabling the display corresponds to one or more of powering on the display, lighting up the display, or rendering information on the display.

Example Methods

Example methods 500, 600, 700, and 800 are described with reference to FIGS. 1, 3, and 4 in accordance with one or more embodiments of display viewing detection. Generally, any of the methods, components, and modules described herein can be implemented using software, firmware, hardware (e.g., fixed logic circuitry), manual processing, or any combination thereof. A software implementation represents program code that performs specified tasks when executed by a computer processor, and the program code can be stored in computer-readable storage media devices.

Figure 5:
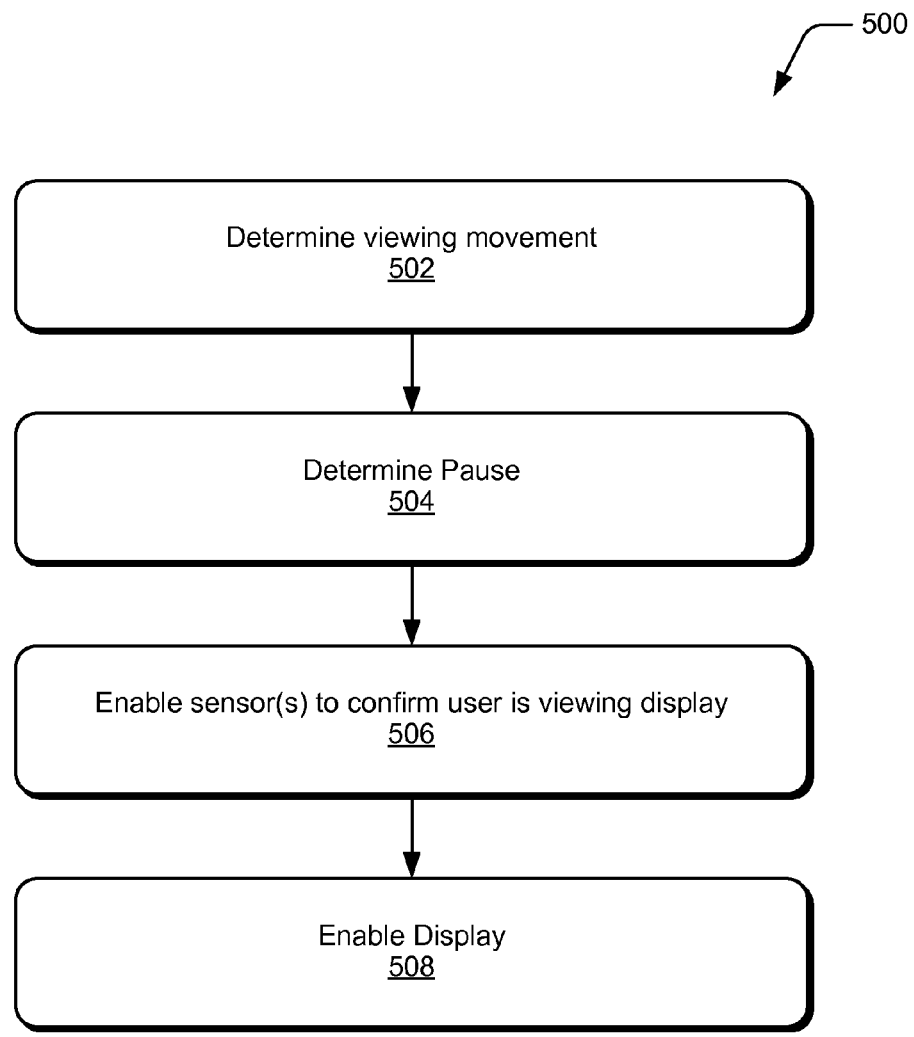
FIG. 5 illustrates an example method of determining whether a user is viewing the display of the electronic device when the device is in the active device mode.

FIG. 5 illustrates an example method 500 of determining whether a user is viewing display 118 of electronic device 102 when the device is in the active device mode. The order in which the method blocks are described is not intended to be construed as a limitation, and any number of the described method blocks can be combined in any order to implement a method, or an alternate method.

Block 502 determines a viewing movement. For example, viewing movement module 114 (FIG. 3) determines a viewing movement 302 of electronic device 102. Viewing movement module 114 can determine the viewing movement in a variety of different ways using sensor data from a variety of different types of sensors. For example, viewing movement module 114 may determine the viewing movement based on acceleration data 304 received from accelerometer 122 and/or rotation data 306 received from gyroscope 124. In one or more implementations, viewing movement module 114 determines the viewing movement when a twisting movement and a linear movement are detected, which is discussed in further detail in example method 600 of FIG. 6.

Block 504 detects a pause in the viewing movement. For example, viewing movement module 114 determines whether a pause 310 in the viewing movement has occurred for a predetermined threshold period of time, such as one second or less. The pause may occurs after the viewing movement. Consider, for example, that after pulling and twisting device 102 towards the user's eyes, the user is likely to pause this movement for a second or a split-second so that the user is able to view display 118. Viewing movement module 114 can determine the pause based on acceleration data 304 received from accelerometer 122 and/or rotation data 306 received from gyroscope 124 that indicates that device 102 is no longer moving.

Block 506 enables one or more sensors to confirm that the user is viewing the display. For example, viewing movement module 114 enables one or more sensors 312 to confirm the user is viewing display 118. In one or more implementations, viewing movement module 114 enables infrared sensor 128, heat sensor 130, and/or imager 132 to confirm that the user is viewing display 118. In one or more implementations, to confirm that the user is viewing display 118, viewing movement module 114 may enable a first sensor to detect an object, and when the first sensor detects the object, enable a second sensor. This implementation is discussed in further detail in example method 700 of FIG. 7.

Block 508 enables a display for viewing. For example, when viewing movement module 114 confirms that the user is viewing display 118 at block 506, viewing movement module 114 enables display 118 for viewing. As described herein, enabling the display corresponds to one or more of powering on the display, lighting up the display, or rendering information on the display.

Figure 6:
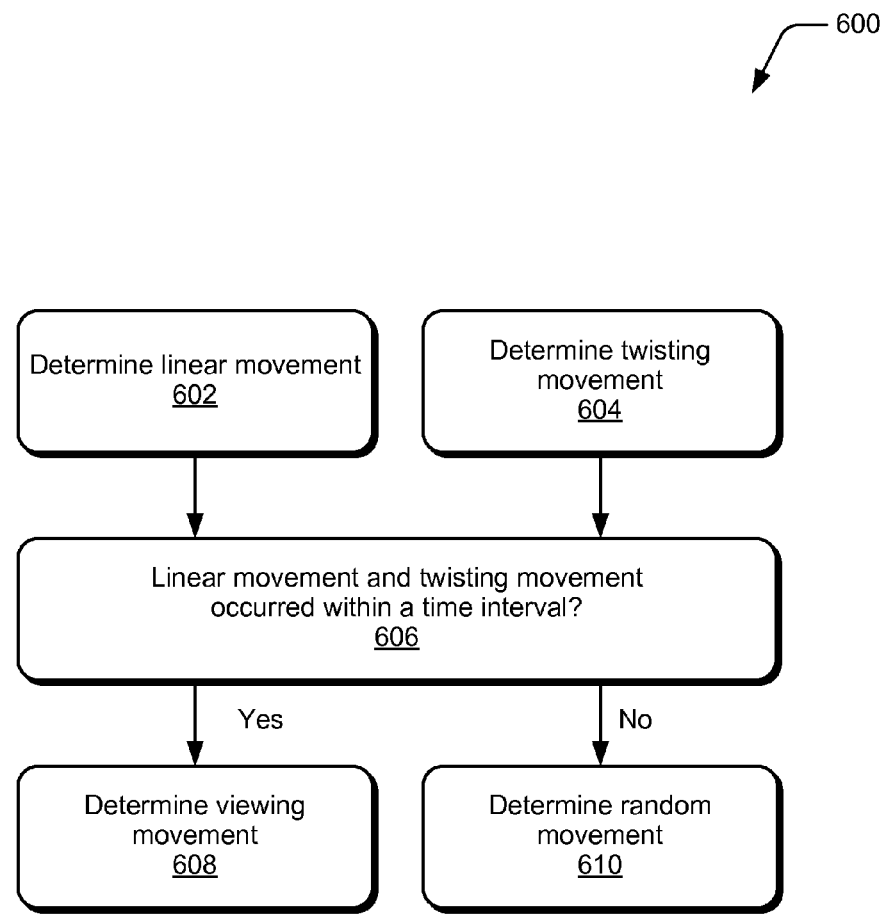
FIG. 6 illustrates an example method of determining a viewing movement in accordance with one or more implementations.

FIG. 6 illustrates an example method 600 of determining a viewing movement in accordance with one or more implementations. The order in which the method blocks are described is not intended to be construed as a limitation, and any number of the described method blocks can be combined in any order to implement a method, or an alternate method.

Block 602 determines a linear movement of an electronic device. For example, viewing movement module 114 (FIG. 3) determines a linear movement of device 102 based on acceleration data 304 received from accelerometer 122. The linear movement may correspond to the user pulling device 102 towards the user's eyes to view display 118.

Block 604 determines a twisting movement of the electronic device. For example, viewing movement module 114 determines a twisting movement of device 102 based on rotation data 306 received from gyroscope 124. The twisting movement may correspond to the user twisting device 102 towards the user's body to view display 118.

Block 606 determines whether the linear movement and the twisting movement occurred with a time interval. For example, viewing movement module 114 may utilize timer 126 to determine whether both the linear movement and the twisting movement occurred within a time interval When s determined that the linear movement and the twisting movement occurred within the time interval, block 608 determines that the linear movement and the twisting movement correspond to the viewing movement. For example, viewing movement module 114 determines that the linear movement and the twisting movement correspond to viewing movement 302. Viewing movement module 114 may then enable display 118 for viewing.

Alternately, when it is determined that the linear movement and the twisting movement did not occur within the time interval, block 610 determines that the linear movement and the twisting movement correspond to a random movement. For example, viewing movement module 114 determines that the linear movement and the twisting movement correspond to a random movement. In this case, viewing movement module 114 does not enable display 116 for viewing.

Figure 7:
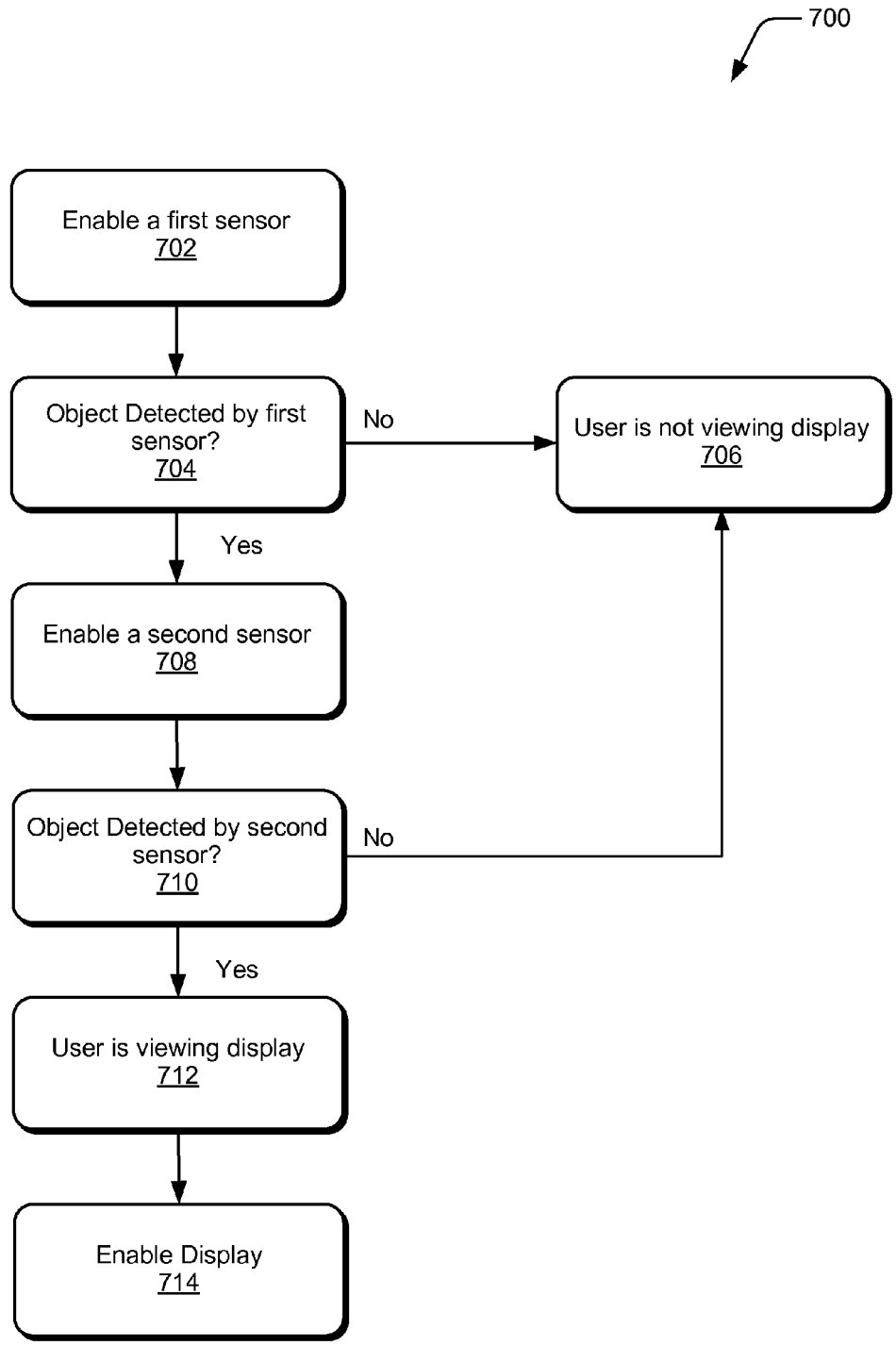
FIG. 7 illustrates an example method of sequentially enabling two sensors to confirm a user is viewing the display of the electronic device in accordance with one or more implementations.

FIG. 7 illustrates an example method 700 of enabling two sensors to confirm a user is viewing display 118 of electronic device 102 in accordance with one or more implementations. In some embodiments, method 700 may be implemented by viewing movement module 114 after determining a viewing movement followed by a pause. In other embodiments, method 700 may be implemented by presence module 116 after determining an object is within a viewing range and that movement of the device is below a threshold. The order in which the method blocks are described are not intended to be construed as a limitation, and any number of the described method blocks can be combined in any order to implement a method, or an alternate method.

Block 702 enables a first sensor to detect an object. For example, one of infrared sensor 128, heat sensor 130, or imager 132 is enabled to confirm that the user is viewing display 118.

Block 704 determines whether an object is detected by the first sensor. When an object is not detected, block 706 determines that the user is not viewing the display, and the method ends without enabling the second sensor. It is to be appreciated therefore, that by enabling only a first sensor saves power because the second sensor does not get enabled in the event that the user is not looking at the display.

When an object is detected at block 704, block 708 enables a second sensor to detect the object. For example, a different one of infrared sensor 128, heat sensor 130, or imager 132 is enabled to confirm that the user is viewing display 118.

Block 710 determines whether the object is detected by the second sensor. When the object is not detected at block 710, block 706 determines that the user is not viewing display 118.

When an object is detected at block 710, block 712 determines that the user is viewing the display, and block 714 enables the display for viewing by the user.

Figure 8:
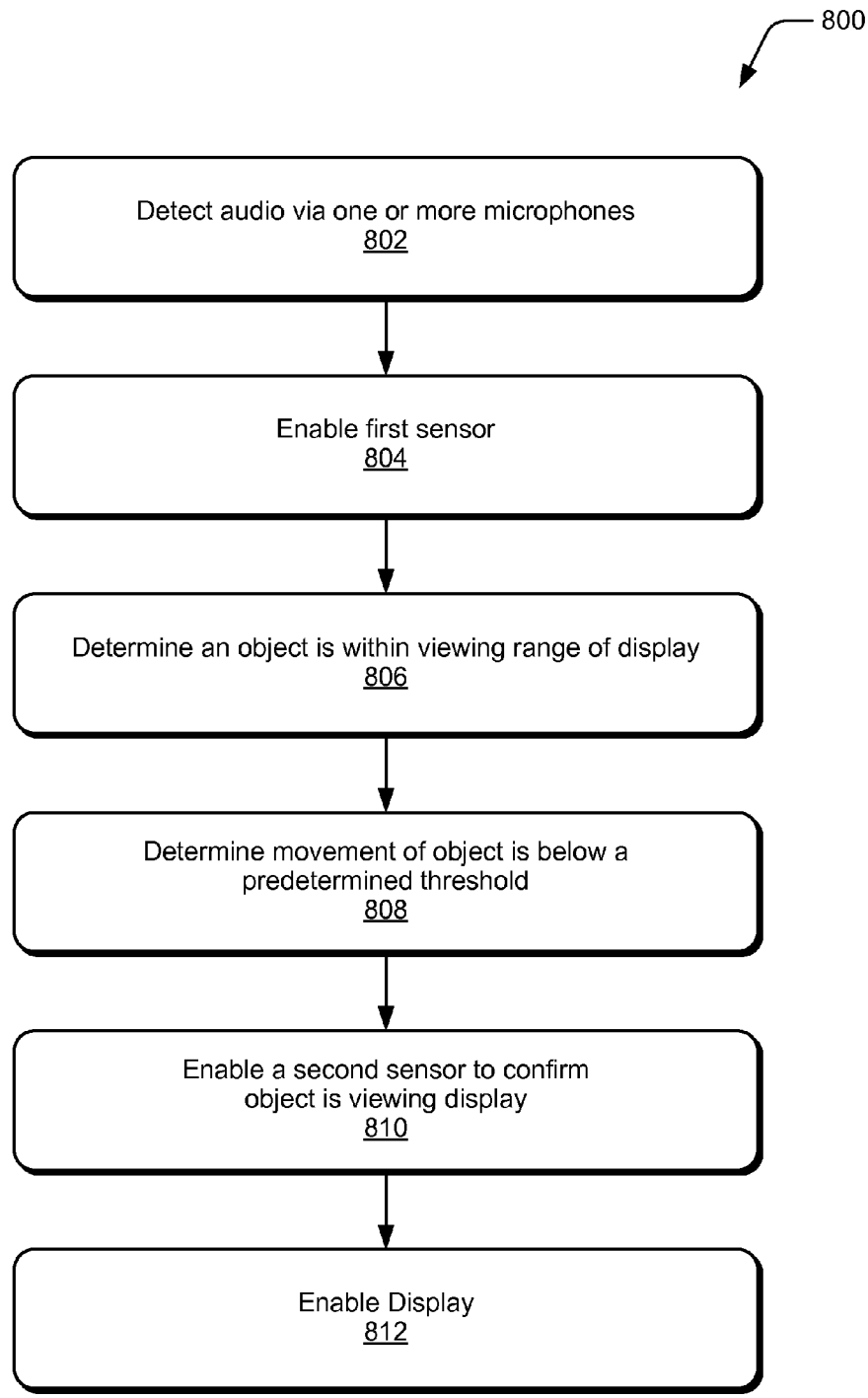
FIG. 8 illustrates an example method of determining whether a user is viewing the display of the electronic device when the device is in the stationary device mode.

FIG. 8 illustrates an example method 800 of determining whether a user is viewing display 118 of electronic device 102 when the device is in the stationary device mode. The order in which the method blocks are described are not intended to be construed as a limitation, and any number of the described method blocks can be combined in any order to implement a method, or an alternate method.

Block 802 detects audio via one or more microphones of an electronic device. For example, microphones 134 (FIG. 4) of electronic device 102 detect audio or noise.

Block 804 enables a first sensor. For example, responsive to detecting the audio at block 802, presence module 116 enables one or more first sensors 404 to detect an object. First sensors 404 may be implemented as one or more of infrared sensor 128, heat sensor 130, imager 132, or any other type of sensor configured to detect an object. In one or more implementations, first sensor 404 is a wide-beam heat sensor 130. Unlike a narrow-beam heat sensor that detects heat from an object that is within close range of device 102, wide-beam sensor 130 is configured to detect objects at greater distances from device 102. For example, wide-beam heat sensor 130 may be implemented as a passive wide-beam heat sensor that includes a receiver configured to detect heat from an object that is located up to 20 feet from device 102 at any position relative to device 102.

Block 806 determines whether an object is within viewing range of a display. For example, presence module 116 determines whether an object (e.g., a user) is within viewing range of display 118. Presence module 116 may determine whether the object is within the viewing range of device 102 based on sensor data 410 received from the enabled first sensor 404. For example, when implemented as heat sensor 130, first sensor 404 can detect an increased amount of body heat from a user as the user approaches device 102, and generate sensor data 410 corresponding to the distance of the user from device 102. Alternately or additionally, presence module 116 may determine whether the user is within the viewing range of device 102 based on audio signal 402 received from microphone 134. For example, as the user approaches device 102, the noise or audio detected by microphone 134 will increase in volume.

When the object is within viewing range of the display, block 808 determines whether movement of the object is below a threshold. For example, presence module 116 determines whether movement of the object (e.g., the user) is below a threshold 412. The threshold may correspond to a low amount of movement, and thus the movement of the object will be below the threshold when the user is standing or sitting mostly still. When the movement is above the threshold, it is likely that user is simply passing by device 102 without looking at display 118.

When movement of the object is below a threshold, block 810 enables a second sensor to confirm whether the object is viewing the display. For example, when presence module 116 determines that the object is within viewing range of display 118, and that movement of the object is below the threshold, presence module 116 enables one or more second sensors 414 to confirm that the object corresponds to a user that is viewing display 118. Presence module 116 may enable any type of second sensors 414 to confirm that the object corresponds to a user viewing display 118, including by way of example and not limitation, infrared sensor 128, heat sensor 130, and/or imager 132. In one or more embodiments, the one or more second sensors 414 are narrow-beam sensors, as opposed to the first sensors that are wide-beam sensors. In one or more implementations, presence module 116 may enable a first sensor to detect an object, and when the first sensor detects the object, enable a second sensor. This implementation is discussed in further detail in example method 700 of FIG. 7.

Block 812 enables a display for viewing. For example, when presence module 116 confirms that the object is viewing display 118 at block 810, presence module 116 enables display 118 for viewing. As described herein, enabling the display corresponds to one or more of powering on the display, lighting up the display, or rendering information on the display.

Example Computer Device

Figure 9:
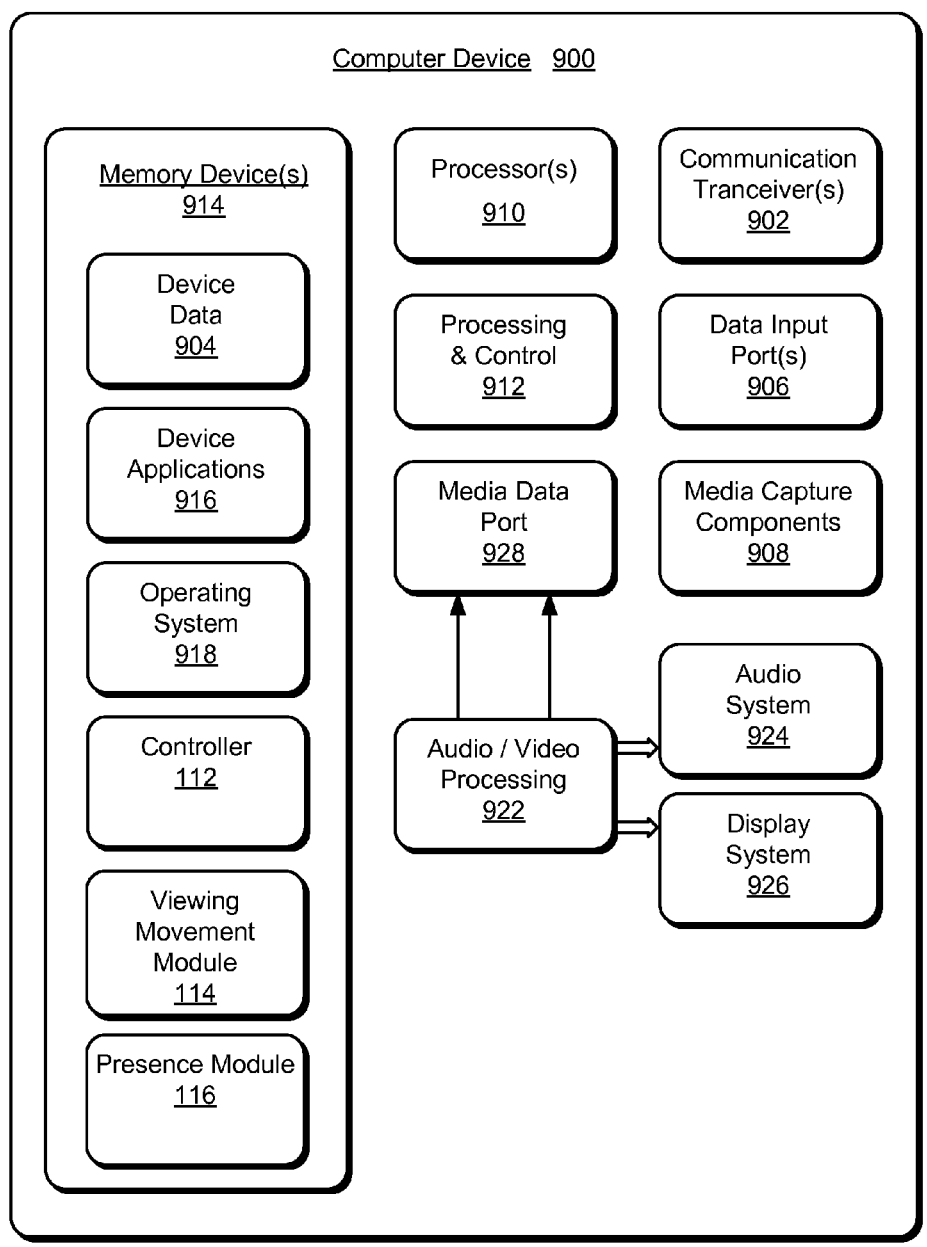
FIG. 9 illustrates various components of an example computer device that can implement embodiments of display viewing detection.

FIG. 9 illustrates various components of an example computer device 900 that can be implemented as any device described with reference to any of the previous FIGS. 1-8, such as electronic device 102. The computer device may be implemented as any one or combination of a fixed or mobile device, in any form of a consumer, computer, portable, user, communication, phone, navigation, gaming, media playback, and/or computer device.

The computer device 900 includes communication transceivers 902 that enable wired and/or wireless communication of device data 904, such as received data, data that is being received, data scheduled for broadcast, data packets of the data, etc. Example communication transceivers 902 include wireless personal area network (WPAN) radios compliant with various IEEE 802.15 (also referred to as Bluetooth™) standards, wireless local area network (WLAN) radios compliant with any of the various IEEE 802.11 (also referred to as WiFi™) standards, wireless wide area network (WWAN) radios for cellular telephony, wireless metropolitan area network (WMAN) radios compliant with various IEEE 802.15 (also referred to as WiMAX™) standards, and wired local area network (LAN) Ethernet transceivers.

The computer device 900 may also include one or more data input ports 906 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the computer device 900 may include media capture components 908, such as an integrated microphone to capture audio and a camera to capture still images and/or video media content.

The computer device 900 includes one or more processors 910 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 912. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computer device 900 also includes one or more memory devices 914 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer device 900 may also include a mass storage media device.

A memory device 914 provides data storage mechanisms to store the device data 904, other types of information and/or data, and various device applications 916 (e.g., software applications). For example, an operating system 918 can be maintained as software instructions within a memory device and executed on the processors 910. The device applications may also include a device manager, such as any form of a control application, software application, signal-processing and control module, code that is native to a particular device, a hardware abstraction layer for a particular device, and so on. In embodiments, the computer device also includes controller 112, viewing movement module 114, and presence module 116.

The computer device 900 also includes an audio and/or video processing system 922 that generates audio data for an audio system 924 and/or generates display data for a display system 926. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 628. Additionally, the audio system and/or the display system may be external components to the computer device, or alternatively, are integrated components of the example computer device.

Although embodiments of display viewing detection have been described in language specific to features and/or methods, the subject of the appended claims is not necessarily limited to the specific features or methods described. Rather, the specific features and methods are disclosed as example implementations of display viewing detection.

The invention claimed is:

1. A method carried out by an electronic device that includes one or more microphones and a first sensor, the method comprising:
    detecting, by the one or more microphones, audio indicating a presence of a user;
    in response to detecting the audio indicating the presence of the user, enabling the first sensor to detect the user;
    determining that the user is within a viewing range of the electronic device based at least in part on data received from the first sensor;
    determining a pause in a movement of the user by determining that the movement of the user is below a predetermined threshold based at least in part on the data received from the first sensor;
    in response to determining that the user is within the viewing range of the electronic device and in response to determining the pause in the movement of the user, enabling at least one second sensor of the electronic device to confirm the user is viewing a display of the electronic device; and
    enabling the display of the electronic device for viewing by the user when the user is detected by the at least one second sensor.

2. The method as recited in claim 1, wherein prior to detecting the audio, the method further comprises determining that the electronic device is stationary based on data received from an accelerometer, wherein the first sensor and the at least one second sensor are disabled when the electronic device is stationary.

3. The method as recited in claim 1, wherein the first sensor comprises a wide beam heat sensor.

4. The method as recited in claim 3, wherein the wide-beam heat sensor comprises multiple heat sensors.

5. The method as recited in claim 4, further comprising adjusting a coverage of the wide beam heat sensor by enabling and disabling different ones of the multiple heat sensors, wherein the adjusting is based on a distance of the user from the electronic device.

6. The method as recited in claim 1, wherein the at least one second sensor comprises a narrow-beam heat sensor.

7. The method as recited in claim 1, wherein the at least one second sensor comprises a narrow-beam infrared sensor.

8. The method as recited in claim 1, wherein the at least one second sensor comprises an imager to recognize the user who is an actual owner of the electronic device.

9. The method as recited in claim 1, wherein enabling the at least one second sensor comprises:
enabling a first narrow-beam sensor;
when the user is detected by the first narrow-beam sensor, enabling a second narrow-beam sensor; and
wherein enabling the display further comprises enabling the display of the electronic device for viewing when the user is detected by both the first narrow-beam sensor and the second narrow-beam sensor.

10. The method as recited in claim 9, wherein the second narrow-beam sensor is not enabled when the user is not detected by the first narrow-beam sensor.

11. The method as recited in claim 9, wherein the first narrow-beam sensor comprises a narrow-beam infrared sensor, and wherein the second narrow-beam sensor comprises a narrow-beam heat sensor.

12. The method as recited in claim 9, wherein the first narrow-beam sensor comprises a narrow-beam heat sensor, and wherein the second narrow-beam sensor comprises a narrow-beam infrared sensor.

13. The method as recited in claim 1, wherein detecting the user by the at least one second sensor comprises enabling an imager to confirm that the at least one second sensor has detected a face of the user.

14. The method as recited in claim 1, wherein enabling the display comprises one or more of powering on the display, lighting up the display, and rendering information on the display.

15. An electronic device, comprising:
one or more microphones configured to detect audio indicating a presence of a user;
a wide-beam sensor configured to detect the user and generate data based on the user;
a narrow-beam sensor configured to detect the user and generate data based on the user;
a display having one or more portions for viewing by the user; and
at least a memory and a processor to implement a presence module, the presence module configured to:
detect the audio indicating the presence of the user via the one or more microphones;
in response to detecting the audio indicating the presence of the user, enable the wide-beam sensor to detect the user;
determine that the user is within a viewing range of the electronic device based on the data from the wide-beam sensor;
determine a pause in a movement of the user by determining that the movement of the user is below a predetermined threshold based on the data from the wide-beam sensor;
in response to determining that the user is within the viewing range of the electronic device and in response to determining the pause in the movement of the user, enable the narrow-beam sensor to detect the user; and
enable at least one of the one or more portions of the display in response to the narrow-beam sensor detecting the user.

16. The electronic device as recited in claim 15, further comprising an accelerometer, wherein the presence module is further configured to, prior to enabling the wide beam sensor, determine that the electronic device is stationary based on data received from the accelerometer, wherein the wide-beam sensor and the narrow-beam sensor are disabled when the electronic device is stationary.

17. The electronic device as recited in claim 15, wherein the presence module is configured to enable the narrow-beam sensor by enabling a narrow-beam infrared sensor and a narrow-beam heat sensor, and wherein the presence module is configured to enable the display for viewing when the user is detected by both the narrow-beam infrared sensor and the narrow-beam heat sensor.

18. The electronic device as recited in claim 15, wherein the presence module is configured to enable the narrow-beam sensor to confirm the user is viewing the display of the electronic device by:
enabling a first narrow-beam sensor;
when the user is detected by the first narrow-beam sensor, enabling a second narrow-beam sensor; and
wherein enabling the display further comprises enabling the display of the electronic device for viewing when the user is detected by both the first narrow-beam sensor and the second narrow-beam sensor.

19. The electronic device as recited in claim 18, wherein the presence module does not enable the second narrow-beam sensor when the user is not detected by the first narrow-beam sensor.

20. A method carried out by an electronic device, the method comprising:
detecting an audio signal indicating a presence of a user via one or more microphones of the electronic device;
in response to detecting the audio signal indicating the presence of the user, detecting the user at a wide-beam sensor and generating data based on the user;
determining that the user is within a viewing range of the electronic device based on the data from the wide-beam sensor;
determining a pause in a movement of the user by determining that the movement of the user is below a predetermined threshold based on the data from the wide-beam sensor;
in response to determining that the user is within the viewing range of the electronic device and in response to determining the pause in the movement of the user, enabling a narrow-beam sensor to detect the user, and
enabling one or more portions of a display of the electronic device in response to the narrow-beam sensor detecting the user.

* * * * *